United States Patent
Calderara et al.

(10) Patent No.: US 8,932,442 B2
(45) Date of Patent: Jan. 13, 2015

(54) ELECTRODE FOR OXYGEN EVOLUTION IN INDUSTRIAL ELECTROLYTIC PROCESSES

(75) Inventors: Alice Calderara, Agnadello (IT); Antonio Lorenzo Antozzi, Merate (IT); Ruben Ornelas Jacobo, Milan (IT)

(73) Assignee: Industrie de Nora S.p.A., Milan (IT)

( * ) Notice: Subject to any disclaimer, the term of this patent is extended or adjusted under 35 U.S.C. 154(b) by 368 days.

(21) Appl. No.: 13/358,968

(22) Filed: Jan. 26, 2012

(65) Prior Publication Data

US 2012/0118754 A1     May 17, 2012

Related U.S. Application Data

(63) Continuation of application No. PCT/EP2010/060839, filed on Jul. 27, 2010.

(30) Foreign Application Priority Data

Jul. 28, 2009   (IT) .............................. MI2009A1343

(51) Int. Cl.

| | |
|---|---|
| *B23H 3/04* | (2006.01) |
| *B23H 5/10* | (2006.01) |
| *B23H 7/22* | (2006.01) |
| *C25B 11/00* | (2006.01) |
| *C25D 17/10* | (2006.01) |
| *C25C 7/02* | (2006.01) |
| *C25F 7/00* | (2006.01) |
| *C25B 11/04* | (2006.01) |

(52) U.S. Cl.
CPC .......... *C25B 11/0484* (2013.01); *Y02E 60/366* (2013.01)
USPC ................. 204/290.09; 204/280; 204/290.03; 204/290.08

(58) Field of Classification Search
CPC .... C25B 11/00; C25B 11/04; C25B 11/0442; C25B 11/0478; C25B 11/0484
USPC .................. 204/280, 290.01, 290.12, 290.14, 204/290.03, 290.08, 290.09
See application file for complete search history.

(56) References Cited

U.S. PATENT DOCUMENTS

| | | | | |
|---|---|---|---|---|
| 5,098,546 A | * | 3/1992 | Kawashima et al. | .... 204/290.09 |
| 5,290,415 A | * | 3/1994 | Shimamune et al. | .... 204/290.09 |
| 5,587,058 A | * | 12/1996 | Gorodetsky et al. | ..... 204/290.09 |
| 6,103,093 A | * | 8/2000 | Nidola et al. | ................. 205/625 |

FOREIGN PATENT DOCUMENTS

GB     2239260 A     6/1991

OTHER PUBLICATIONS

International Search Report for Application No. PCT/EP2010/060839 dated Nov. 2, 2010. 2 pages.

* cited by examiner

*Primary Examiner* — Luan Van
*Assistant Examiner* — Alexander W Keeling
(74) *Attorney, Agent, or Firm* — Lucas & Mercanti, LLP

(57) ABSTRACT

The invention relates to a catalytic coating suitable for oxygen-evolving anodes in electrochemical processes. The catalytic coating comprises an outermost layer with an iridium and tantalum oxide-based composition modified with amounts not higher than 5% by weight of titanium oxide.

14 Claims, No Drawings

ELECTRODE FOR OXYGEN EVOLUTION IN INDUSTRIAL ELECTROLYTIC PROCESSES

CROSS-REFERENCE TO RELATED APPLICATION

This application is a continuation of PCT/EP2010/0608397 filed Jul. 27, 2010, that claims the benefit of the priority date of Italian Patent Application No. MI2009A001343 filed Jul. 28, 2009, the contents of which are herein incorporated by reference in their entirety.

FIELD

The invention relates to an electrode suitable for functioning as anode in electrochemical cells, for instance as oxygen-evolving anode in electrolytic cells for electrometallurgical processes.

BACKGROUND

The invention relates to an electrode suitable for use in industrial electrochemical processes, for instance in electrolytic applications involving an oxygen evolution anodic reaction. Oxygen-evolving anodes are widely used in several electrochemical applications, many of which fall in the domain of electrometallurgy and cover a wide range in terms of applied current density, which can be very low (for instance few hundreds $A/m^2$, as in electrowinning processes) but also very high (for instance fast plating, in which 10 $kA/m^2$ referred to the anodic surface can be exceeded). Another field of application for oxygen-evolving anodes is given by impressed current cathodic protection. Electrodes suitable for anodic oxygen evolution can be obtained starting from valve metal substrates, for example titanium and alloys thereof, coated with catalytic compositions based on transition metals or alloys thereof, characterised by their capability to lower the oxygen discharge anodic overvoltage, too high to allow carrying out industrial processes in the absence of catalytic systems. A composition suitable for catalysing anodic oxygen evolution comprises, for instance, a mixture of oxides of iridium and tantalum, wherein iridium constitutes the catalytically active species and tantalum favours the formation of a compact coating, capable of protecting the valve metal substrate from corrosion phenomena especially when operating with aggressive electrolytes. An anode formulation suitable for anodic oxygen evolution in many industrial electrochemical processes comprises a titanium substrate and a catalytic coating comprising iridium and tantalum oxides of molar composition referred to the metals of 65% Ir and 35% Ta. In some cases, for examples to be able to operate with very acidic or otherwise aggressive electrolytes, it can be advantageous to interpose a protective interlayer between the titanium substrate and the catalytic coating, for instance comprising titanium and tantalum oxides of molar composition referred to the metals of 80% Ti and 20% Ta. This kind of electrode can be prepared in several ways, for example by thermal decomposition at high temperature, for instance from about 400° C. to about 600° C., of a precursor solution. An electrode with the above-specified composition can meet the needs of many industrial applications, both at low or high current density, with reasonable operative lifetimes. The economics of some productive processes especially in the metallurgical domain (for instance copper deposition in galvanic processes for the manufacturing of printed circuits and copper foil) nevertheless require that electrodes have a higher and higher duration, versus a suitably reduced oxygen evolution potential also at high current density. Oxygen evolution potential is one of the main factors in determining the process operative voltage and therefore the overall energy consumption. Moreover, the operative lifetime of anodes based on noble metals or oxides thereof on valve metal substrates is remarkably reduced in the presence of particularly aggressive pollutants, capable of establishing accelerated phenomena of corrosion or of fouling of the anode surface. An example of the former type is given by fluoride ions, which determine a specific attack on valve metals such as titanium deactivating the electrodes very quickly. In some industrial environments, remarkable costs have to be faced to reduce fluoride concentration to extremely low levels, since a fluoride ion content higher than 0.2 parts per million (ppm) can be capable of showing effects on the duration of the anodes. An example of the latter type is conversely given by manganese ions, present in several industrial electrolytes in a typical amount of 2-30 g/l, which starting from concentrations as low as 1 g/l have the tendency to film the anode surface with an $MnO_2$ layer liable to blind their catalytic activity and being difficult to remove without causing damages.

It has been, therefore, made evident of the need to provide anodes for oxygen evolution characterised by higher operative lifetimes even in particularly critical process conditions, such as a high current density or the presence of particularly aggressive electrolytes, for instance due to the presence of contaminant species.

DESCRIPTION

Various aspects of the invention are set out in the accompanying claims.

In one embodiment, the invention relates to an electrode suitable for functioning as an anode in electrolytic processes, comprising a substrate of titanium or other valve metal and a catalytic coating of one or more layers, whose outermost layer, suitable for working in contact with the electrolyte, includes oxides of iridium, tantalum and titanium with a molar composition referred to the metals of from about 76% to about 84% iridium (Ir), from about 15% to about 23% tantalum (Ta), and from about 0.2% to about 1.3% titanium (Ti). The inventors surprisingly observed that the addition of small amounts of titanium to a catalytic composition very rich in iridium has the capability of increasing the duration of an electrode used for anodic oxygen evolution to a remarkable extent, and improving its tolerance to the presence of contaminant species. In one embodiment, a catalytic coating of multiple layers comprising an internal layer of oxides of iridium and tantalum with a molar composition referred to the metals of from about 60% to about 70% Ir and from about 30% to about 40% Ta, and an external layer of oxides of iridium, tantalum and titanium with a molar composition referred to the metals of from about 76% to about 84% Ir, from about 15% to about 23% Ta, and from about 0.2% to about 1.3% Ti. This can have the advantage of better distributing iridium, by far the most expensive component of the electrode, so as to maximise its efficacy for a given overall loading. The optimum overall loading of iridium in the catalytic coating depends on the specific type of application for which the electrode is destined and on the minimum operative lifetime required to the anode in such application. In one embodiment, the overall specific loading of iridium in the catalytic coating is from about 20 grams per square meter ($g/m^2$) to about 50 $g/m^2$, optionally subdivided into an internal layer containing from about 15% to about 25% of total loading and an external layer containing the rest.

In one embodiment, a protective interlayer, for instance based on titanium and/or tantalum oxides, is interposed between the substrate and the catalytic layer. In one embodiment, the interlayer comprises a mixture of oxides of titanium and tantalum with a composition of from about 75% to about 85% Ti, and from about 15% to about 25% Ta referred to the metals. In another embodiment, a protective interlayer comprises titanium oxide formed by a process of thermal oxidation of the titanium substrate. These embodiments can have the advantage of providing the substrate with an adequate form of protection against the electrolyte corrosive attack without excessively burdening the cost of the electrode. A person skilled in the art will, nevertheless, be able to identify other types of protective interlayer, such as titanium and/or tantalum oxides applied by flame or plasma spraying, galvanically or by means of different techniques of chemical or physical vapour deposition, optionally under vacuum (CVD, PVD, IBAD, sputtering) according to the specific requirements.

Some of the most significant results obtained by the inventors are presented in the following examples, which are not intended as a limitation of the extent of the invention.

Example 1

A titanium sheet grade 1 of 200×200×3 mm size was degreased and subjected first to sandblasting with iron grit until obtaining a value of superficial roughness $R_z$ of 70 to 100 μm, then to etching in 20% by weight HCl at a temperature of 90-100° C. for 20 minutes.

After drying, a protective layer based on titanium and tantalum oxides at a 80:20 weight ratio was applied to the sheet, with an overall loading of 0.6 g/m² referred to the metals (equivalent to 0.87 g/m² referred to the oxides). The application of the protective layer was carried out by painting in three coats of a precursor solution—obtained by addition of an aqueous $TaCl_5$ solution, acidified with HCl, to an aqueous solution of $TiCl_4$—and subsequent thermal decomposition at 500° C.

A catalytic coating based on oxides of iridium, tantalum and titanium at a 78:20:2 weight ratio (corresponding to a molar ratio of about 80.1:19.4:0.5) was then applied on the protective layer, with an overall loading of iridium of 45 g/m². The application of the catalytic coating was carried out by painting in 22 coats of a precursor solution—obtained by addition of an aqueous $TaCl_5$ solution, acidified with HCl, to an aqueous solution of $TiCl_4$, then of $H_2IrCl_6$ until reaching an Ir concentration of 195 g/l—and subsequent thermal decomposition at 480° C.

Three samples of 10 cm² surface were cut out from the thus obtained electrode and submitted to an accelerated lifetime test under anodic oxygen evolution, measuring the deactivation time (defined as the operating time required to observe a potential increase of 1 V) in $H_2SO_4$ at 150 g/l, at a temperature of 60° C. and at a current density of 30 kA/m².
The average deactivation time for the three samples was 5245 hours.
Similar series of three samples were subjected to the same test in the presence of 1 mg/l and 5 mg/l of fluoride ion: following such test, an average deactivation time of 3715 and 980 hours was detected, respectively.

A similar series of three samples was subjected to the test in the presence of 20 g/l of manganese ions: following such test, an average deactivation time of 3900 hours was detected.

Example 2

A titanium sheet grade 1 of 200×200×3 mm size was degreased and subjected first to sandblasting with iron grit until obtaining a value of superficial roughness $R_z$ of 70 to 100 μm, then to etching in 20% by weight HCl at a temperature of 90-100° C. for 20 minutes.

After drying, a protective layer based on titanium and tantalum oxides at a 80:20 weight ratio was applied to the sheet, with an overall loading of 0.6 g/m² referred to the metals (equivalent to 0.87 g/m² referred to the oxides). The application of the protective layer was carried out by painting in three coats of a precursor solution—obtained by addition of an aqueous $TaCl_5$ solution, acidified with HCl, to an aqueous solution of $TiCl_4$—and subsequent thermal decomposition at 500° C.

A catalytic coating consisting of two distinct layers was then applied on the protective layer: a first (internal) layer based on oxides of iridium and tantalum in a 65:35 weight ratio (equivalent to a molar ratio of about 66.3:36.7), with an overall loading of iridium of 10 g/m², and a second (external) layer based on oxides of iridium, tantalum and titanium, at a 78:20:2 weight ratio (corresponding to a molar ratio of about 80.1:19.4:0.5), with an overall loading of iridium of 35 g/m².

The application of the internal catalytic layer was carried out by painting in 8 coats of a precursor solution—obtained by addition of $H_2IrCl_6$ to an aqueous $TaCl_5$ solution, until reaching an Ir concentration of 76 g/l—and subsequent thermal decomposition at 520° C.
The application of the external catalytic layer was carried out by painting in 14 coats of a precursor solution—obtained by addition of an aqueous $TaCl_5$ solution, acidified with HCl, to an aqueous solution of $TiCl_4$, then of $H_2IrCl_6$ until reaching an Ir concentration of 195 g/l—and subsequent thermal decomposition at 480° C.

Three samples of 10 cm² surface were cut out from the thus obtained electrode and submitted to an accelerated lifetime test under anodic oxygen evolution, measuring the deactivation time (defined as the operating time required to observe a potential increase of 1 V) in $H_2SO_4$ at 150 g/l, at a temperature of 60° C. and at a current density of 30 kA/m².
The average deactivation time for the three samples was 6270 hours.
Similar series of three samples were subjected to the same test in the presence of 1 mg/l and 5 mg/l of fluoride ion: following such test, an average deactivation time of 4080 and 1360 hours was detected, respectively.

A similar series of three samples was subjected to the test in the presence of 20 g/l of manganese ions: following such test, an average deactivation time of 4420 hours was detected.

Example 3

A titanium sheet grade 1 of 200×200×3 mm size was degreased and subjected first to sandblasting with iron grit until obtaining a value of superficial roughness $R_z$ of 70 to 100 μm, then to etching in 20% by weight HCl at a temperature of 90-100° C. for 20 minutes.

After drying, the sheet was subjected to a thermal treatment at 650° C. for 3 hours in the presence of air, obtaining the growth of a protective titanium oxide layer.

A catalytic coating based on oxides of iridium, tantalum and titanium at a 80:15:5 weight ratio (corresponding to a molar ratio of about 83.9:14.8:1.3) was then applied on the protective layer, with an overall loading of iridium of 45 g/m². The application of the catalytic coating was carried out by painting in 20 coats of a precursor solution—obtained by addition of an aqueous $TaCl_5$ solution, acidified with HCl, to an aqueous solution of $TiCl_4$, then of $H_2IrCl_6$ until reaching an Ir concentration of 195 g/l—and subsequent thermal decomposition at 480° C.

Three samples of 10 cm² surface were cut out from the thus obtained electrode and submitted to an accelerated lifetime test under anodic oxygen evolution, measuring the deactivation time (defined as the operating time required to observe a potential increase of 1 V) in $H_2SO_4$ at 150 g/l, at a temperature of 60° C. and at a current density of 30 kA/m².

The average deactivation time for the three samples was 4980 hours.

Similar series of three samples were subjected to the same test in the presence of 1 mg/l and 5 mg/l of fluoride ion: following such test, an average deactivation time of 3630 and 920 hours was detected, respectively.

A similar series of three samples was subjected to the test in the presence of 20 g/l of manganese ions: following such test, an average deactivation time of 2100 hours was detected.

Example 4

A titanium sheet grade 1 of 200×200×3 mm size was degreased and subjected to the deposition of a protective layer of oxides of titanium and tantalum at a 70:30 weight ratio, with a thickness of about 25 μm, by plasma spraying.

A catalytic coating based on oxides of iridium, tantalum and titanium at a 75:24:1 weight ratio (corresponding to a molar ratio of about 76.6:23.1:0.3) was then applied on the protective layer, with an overall loading of iridium of 20 g/m². The application of the catalytic coating was carried out by painting in 15 coats of a precursor solution—obtained by addition of an aqueous $TaCl_5$ solution, acidified with HCl, to an aqueous solution of $TiCl_4$, then of $H_2IrCl_6$ until reaching an Ir concentration of 195 g/l—and subsequent thermal decomposition at 480° C.

Three samples of 10 cm² surface were cut out from the thus obtained electrode and submitted to an accelerated lifetime test under anodic oxygen evolution, measuring the deactivation time (defined as the operating time required to observe a potential increase of 1 V) in $H_2SO_4$ at 150 g/l, at a temperature of 60° C. and at a current density of 30 kA/m².

The average deactivation time for the three samples was 3600 hours.

Similar series of three samples were subjected to the same test in the presence of 1 mg/l and 5 mg/l of fluoride ion: following such test, an average deactivation time of 870 and 120 hours was detected, respectively.

A similar series of three samples was subjected to the test in the presence of 20 g/l of manganese ions: following such test, an average deactivation time of 2460 hours was detected.

Counter Example 1

A titanium sheet grade 1 of 200×200×3 mm size was degreased and subjected first to sandblasting with iron grit until obtaining a value of superficial roughness $R_z$ of 70 to 100 μm, then to etching in 20% by weight HCl at a temperature of 90-100° C. for 20 minutes.

After drying, a protective layer based on titanium and tantalum oxides at a 80:20 weight ratio was applied to the sheet, with an overall loading of 0.6 g/m² referred to the metals (equivalent to 0.87 g/m² referred to the oxides). The application of the protective layer was carried out by painting in three coats of a precursor solution—obtained by addition of an aqueous $TaCl_5$ solution, acidified with HCl, to an aqueous solution of $TiCl_4$—and subsequent thermal decomposition at 500° C.

A catalytic coating based on oxides of iridium and tantalum at a 65:35 weight ratio was then applied on the protective layer, with an overall loading of iridium of 45 g/m². The application of the catalytic coating was carried out by painting in 29 coats of a precursor solution—obtained by addition of $H_2IrCl_6$ to an aqueous $TaCl_5$ solution until reaching an Ir concentration of 76 g/l—and subsequent thermal decomposition at 520° C.

Three samples of 10 cm² surface were cut out from the thus obtained electrode and submitted to an accelerated lifetime test under anodic oxygen evolution, measuring the deactivation time (defined as the operating time required to observe a potential increase of 1 V) in $H_2SO_4$ at 150 g/l, at a temperature of 60° C. and at a current density of 30 kA/m².

The average deactivation time for the three samples was 2800 hours.

Similar series of three samples were subjected to the same test in the presence of 1 mg/l of fluoride ion: for all the three samples, a deactivation time lower than 100 hours was detected.

A similar series of three samples was subjected to the test in the presence of 20 g/l of manganese ions: following such test, an average deactivation time of 1550 hours was detected.

Counter Example 2

A titanium sheet grade 1 of 200×200×3 mm size was degreased and subjected first to sandblasting with iron grit until obtaining a value of superficial roughness $R_z$ of 70 to 100 μm, then to etching in 20% by weight HCl at a temperature of 90-100° C. for 20 minutes.

After drying, a protective layer based on titanium and tantalum oxides at a 80:20 weight ratio was applied to the sheet, with an overall loading of 0.6 g/m² referred to the metals (equivalent to 0.87 g/m² referred to the oxides). The application of the protective layer was carried out by painting in three coats of a precursor solution—obtained by addition of an aqueous $TaCl_5$ solution, acidified with HCl, to an aqueous solution of $TiCl_4$—and subsequent thermal decomposition at 500° C.

A catalytic coating based on oxides of iridium and tantalum at a 80:20 weight ratio was then applied on the protective layer, with an overall loading of iridium of 45 g/m². The application of the catalytic coating was carried out by painting in 30 coats of a precursor solution—obtained by addition of $H_2IrCl_6$ to an aqueous $TaCl_5$ solution until reaching an Ir concentration of 76 g/l—and subsequent thermal decomposition at 520° C.

Three samples of 10 cm² surface were cut out from the thus obtained electrode and submitted to an accelerated lifetime test under anodic oxygen evolution, measuring the deactivation time (defined as the operating time required to observe a potential increase of 1 V) in $H_2SO_4$ at 150 g/l, at a temperature of 60° C. and at a current density of 30 kA/m².

The average deactivation time for the three samples was 2940 hours.

Similar series of three samples were subjected to the same test in the presence of 1 mg/l of fluoride ion: for all the three samples, a deactivation time lower than 100 hours was detected.

A similar series of three samples was subjected to the test in the presence of 20 g/l of manganese ions: following such test, an average deactivation time of 1020 hours was detected.

Counter Example 3

A titanium sheet grade 1 of 200×200×3 mm size was degreased and subjected first to sandblasting with iron grit until obtaining a value of superficial roughness $R_z$ of 70 to 100 µm, then to etching in 20% by weight HCl at a temperature of 90-100° C. for 20 minutes.

After drying, a protective layer based on titanium and tantalum oxides at a 80:20 weight ratio was applied to the sheet, with an overall loading of 0.6 g/m² referred to the metals (equivalent to 0.87 g/m² referred to the oxides). The application of the protective layer was carried out by painting in three coats of a precursor solution—obtained by addition of an aqueous $TaCl_5$ solution, acidified with HCl, to an aqueous solution of $TiCl_4$—and subsequent thermal decomposition at 500° C.

A catalytic coating based on oxides of iridium, tantalum and titanium at a 63:35:2 weight ratio was then applied on the protective layer, with an overall loading of iridium of 45 g/m². The application of the catalytic coating was carried out by painting in 29 coats of a precursor solution—obtained by addition of an aqueous $TaCl_5$ solution, acidified with HCl, to an aqueous solution of $TiCl_4$, then of $H_2IrCl_6$ until reaching an Ir concentration of 76 g/l—and subsequent thermal decomposition at 520° C.

Three samples of 10 cm² surface were cut out from the thus obtained electrode and submitted to an accelerated lifetime test under anodic oxygen evolution, measuring the deactivation time (defined as the operating time required to observe a potential increase of 1 V) in $H_2SO_4$ at 150 g/l, at a temperature of 60° C. and at a current density of 30 kA/m².
The average deactivation time for the three samples was 2170 hours.

Similar series of three samples were subjected to the same test in the presence of 1 mg/l of fluoride ion: for all the three samples, a deactivation time lower than 100 hours was detected.

A similar series of three samples was subjected to the test in the presence of 20 g/l of manganese ions: following such test, an average deactivation time of 940 hours was detected.

The previous description is not intended to limit the invention, which may be used according to different embodiments without departing from the scopes thereof, and whose extent is univocally defined by the appended claims.

Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. Electrode for oxygen evolution in electrochemical processes comprising a valve metal substrate and a catalytic coating comprising an outer layer of oxides of iridium, tantalum and titanium with a molar composition comprising from about 76% to about 84% iridium, from about 15% to about 23% tantalum, and from about 0.2% to about 1.3% titanium, referred to the metals.

2. The electrode according to claim 1, wherein the catalytic coating comprises an inner layer of oxides of iridium and tantalum with a molar composition of from about 60% to about 70% iridium, and from about 30% to about 40% tantalum, referred to the metals.

3. The electrode according to claim 1, wherein the catalytic coating has a specific loading of iridium of from about 20 g/m² to about 50 g/m².

4. The electrode according to claim 2, wherein the specific loading of iridium of the inner layer corresponds to about 15% to about 25% of the overall specific loading of iridium of the catalytic coating.

5. The electrode according to claim 1, further comprising an intermediate protection layer based on titanium or tantalum oxides interposed between the substrate and the catalytic coating.

6. The electrode according to claim 5, wherein the intermediate protection layer comprises a mixture of titanium and tantalum oxides with a molar composition of from about 75% to about 85% titanium and from about 15% to about 25% tantalum, referred to the metals.

7. The electrode according to claim 5, wherein the valve metal of the substrate comprises titanium and the intermediate protection layer comprises titanium oxide formed by thermal oxidation of the substrate.

8. Method of manufacturing an electrode comprising:
applying and subsequently thermally decomposing a solution comprising an iridium precursor of concentration higher than 180 grams of iridium per liter to form an outer layer of oxides of iridium, tantalum and titanium with a molar composition comprising from about 76% to about 84% iridium, from about 15% to about 23% tantalum, and from about 0.2% to about 1.3% titanium, referred to the metals.

9. Method of claim 8 further comprising forming an inner layer by application and subsequent thermal decomposition of a solution containing an iridium precursor of concentration comprised between 70 and 80 grams of iridium per liter.

10. Method of claim 9, comprising forming an intermediate protection layer by means of a technique comprising one or more of flame or plasma spraying, galvanic deposition and chemical or physical vapour deposition, optionally under vacuum.

11. The method according to claim 8, wherein the iridium precursor is $H_2IrCl_6$.

12. Industrial electrochemical process comprising anodically evolving oxygen from an electrolytic bath on an electrode, the electrode comprising a valve metal substrate and a catalytic coating comprising an outer layer of oxides of iridium, tantalum and titanium with a molar composition of from about 76% to about 84% iridium, from about 15% to about 23% tantalum, and from about 0.2% to about 1.3% titanium, referred to the metals.

13. The process according to claim 12, wherein the electrolytic bath contains at least 0.2 ppm of fluoride ions.

14. The process according to claim 12, wherein the electrolytic bath contains at least 1 g/l of manganese ions.

* * * * *